United States Patent
Kyrtsos

[19]

[11] Patent Number: 6,072,388
[45] Date of Patent: Jun. 6, 2000

[54] DRIVELINE SOUND MONITOR

[75] Inventor: Christos T. Kyrtsos, Southfield, Mich.

[73] Assignee: Meritor Heavy Vehicle Systems LLC, Troy, Mich.

[21] Appl. No.: 09/218,711

[22] Filed: Dec. 22, 1998

[51] Int. Cl.⁷ .................................................. B60Q 1/00
[52] U.S. Cl. ...................... 340/439; 340/438; 340/453; 340/441; 340/683; 73/593; 73/591; 73/570
[58] Field of Search ..................................... 340/439, 438, 340/453, 988, 4, 440, 441, 682, 683, 679; 73/593, 40.5 A, 591, 570, 865.6, 862, 669

[56] References Cited

U.S. PATENT DOCUMENTS

| | | | |
|---|---|---|---|
| 2,324,305 | 7/1943 | Kurtz | 73/591 |
| 4,530,240 | 7/1985 | Board et al. | 73/593 |
| 4,550,603 | 11/1985 | Fukada et al. | 73/593 |
| 4,649,743 | 3/1987 | Sugimoto et al. | 73/593 |
| 5,436,612 | 7/1995 | Aduddell | 340/438 |
| 5,445,026 | 8/1995 | Eagan | 73/591 |
| 5,644,084 | 7/1997 | Kinoshita et al. | 73/579 |
| 5,893,892 | 4/1999 | Loeffler | 701/29 |

*Primary Examiner*—Daniel J. Wu
*Assistant Examiner*—Tai T. Nguyen
*Attorney, Agent, or Firm*—Howard & Howard

[57] ABSTRACT

A method of monitoring sounds of a driveline includes detecting a sound from a driveline, comparing the detected sound with a predicted sound of the driveline, and, when the detected sound differs from the predicted sound of the driveline, sending a warning signal that the driveline may be experiencing a problem. The method of monitoring the sounds of a driveline is used to determine the physical condition of the driveline. The present invention allows the driver to check the physical condition of a driveline while operating the vehicle. A sound detector detects sounds from a driveline and send sound signals to a control which receives the sound signals, performs computations based on the detected sounds, and compares the computations with predicted sounds of the driveline. The control sends warning signals to a display, when the detected sounds differ from the predicted sounds.

9 Claims, 3 Drawing Sheets

DRIVELINE SOUND MONITOR

BACKGROUND OF THE INVENTION

The invention relates to a method of monitoring the sounds of an automotive driveline to determine the physical condition of the driveline. The driveline sound is used to indicate potential physical damage to the driveline.

During use, automotive drivelines receive a high amount of physical impact and pressure. Drivelines require routine maintenance and inspection to preserve the life of the driveline and to prevent potential physical damage during use of the driveline. A driveline of a particular vehicle model has specific characteristics when in motion. The characteristics of a driveline include a characteristic sound. The sound of a driveline during safe use includes amplitudes of frequencies within a predicted range, which is indicative of no physical damage to the driveline. When the amplitudes of frequencies fall outside the predicted range, the driveline may have physical damage.

Presently, to diagnose the physical condition of a driveline of a vehicle, the driver or mechanic is required to routinely check under the vehicle for the outer physical appearance of the driveline. An appearance that is out of the ordinary is indicative of potential physical damage to the driveline. Such appearances may include thinning of the metal, metallic dust or rust around connecting joints of the driveline, obvious protrusions and indentations normally not present, etc. By checking the outer physical appearance of the driveline, the driver or the mechanic makes a determination as to the physical condition of the driveline. In situations where there is an indication of potential physical damage to the driveline, the driver or mechanic must determine whether the driveline has experienced excessive conditions which may lead to failure of or damage to the driveline during further use of the vehicle. In situations where the driveline shows no indication of potential physical damage, the driver or mechanic must still make a determination as to the physical condition of the driveline based on the age of the driveline.

The current method of routinely checking the outer physical appearance of the driveline is somewhat time consuming and sometimes inaccurate. This current method requires the driver to periodically manually look under the vehicle to determine the condition of the driveline. A considerable amount of time is usually taken to make this determination.

Additionally, in many situations, this current method is inaccurate because it relies on the driver's judgment regarding the driveline condition which depends either on the outside physical appearance of the driveline or the age of the driveline. No consideration is made on the driveline parts outside the scope of vision of the driver. Moreover, in many circumstances, the driver or mechanic is not technically trained in determining the physical condition of the driveline.

SUMMARY OF THE INVENTION

In a disclosed embodiment of the invention, a method of monitoring the sounds of a driveline is used to determine the physical condition of the driveline. The present invention eliminates the need for the driver of the vehicle to physically check underneath the vehicle in order to determine the physical condition of the driveline. The present invention allows the driver to check the physical condition of a driveline while operating the vehicle. The present invention provides a more time efficient, accurate, and safe way to monitor the physical condition of the driveline of a vehicle.

The present invention includes a method of monitoring the sounds of a driveline, which generally comprises detecting sounds from a driveline of a vehicle, sending sound signals of the detected sounds, receiving the sound signals, performing computations of the detected sounds, comparing the computations with predicted sounds, and sending warning signals when necessary. A sound detector may be used to detect sounds of the driveline and send sound signals to a control which performs the computations and compares the computations with predicted sounds. Finally, the control may send warning signals to a display indicating that a problem may be present.

These and other features of the present invention can be understood from the following specification and drawings.

DETAILED DESCRIPTION OF A PREFERRED EMBODIMENT

Figure 1:
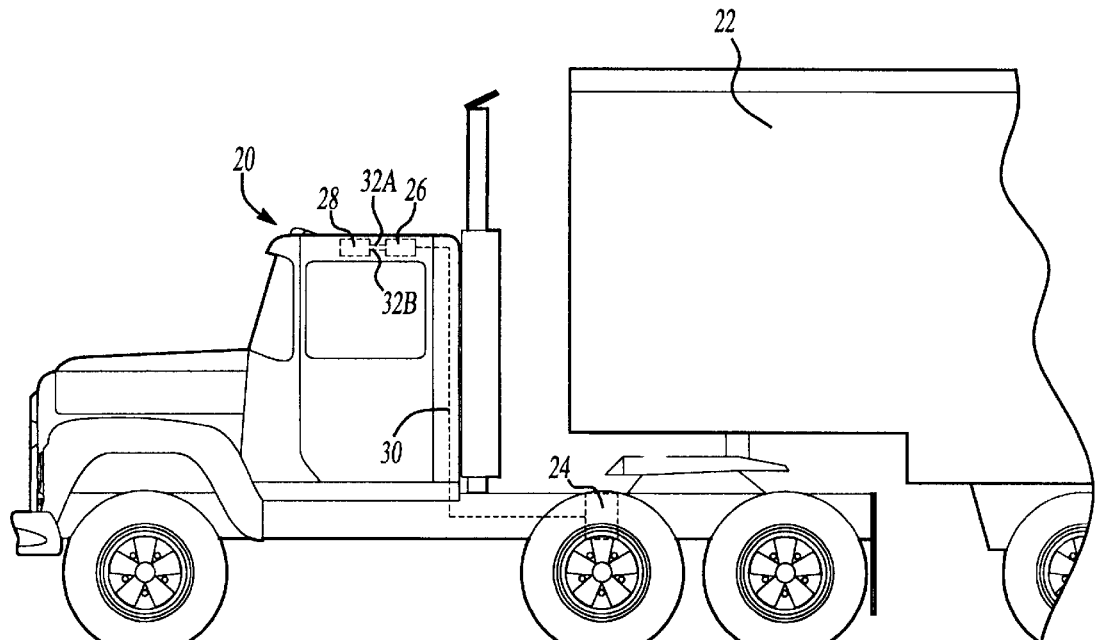
FIG. 1 is a schematic view of one system incorporating the present invention.

FIG. 1 shows a system 20 incorporating the present invention. The method of this invention involves monitoring the sounds of a driveline to determine the physical condition of the driveline of a vehicle 22 by using a sound detector 24, a control 26, and a display 28. In the present invention, a driveline includes parts that connect the transmission with the driving axles of a vehicle.

The sound detector 24 is shown schematically associated with a driveline of the vehicle 22. In a preferred embodiment, the sound detector 24 detects the sounds from the driveline during operation of the vehicle 22 and sends sound signals 30 representing the detected sounds to the control 26. The detector 24 may be any suitable device known in the art which can detect sound and send signals that represent the detected sounds. Moreover, a plurality of detectors may be used in the present invention to detect sounds from different locations on a driveline. Additionally, the detector may also be an ultrasound detector. The medium for sending signals that represent the detected sounds may be any suitable medium.

The control 26 receives the sound signals 30 from the detector 24, performs computations based on the detected sounds, and compares the computations with predicted sounds of the driveline. If the detected sounds differ from the predicted sounds of the driveline, then warning signals 32A, 32B may be sent from the control 26 to the display 28 indicating that the driveline may have a problem.

The control 26 may be any suitable device known in the art which can receive sound signals, perform computations based on the so and signals, and compare the computations with predicted sounds of the driveline. For example, a central processing unit such as a computer that is programmed to perform such tasks may be used. Furthermore, the display 28 may be any suitable device known in the art which can receive warning signals and indicate a problem. For example, a computer monitor, an LED, or a sound emitting device may be used.

Figure 2:
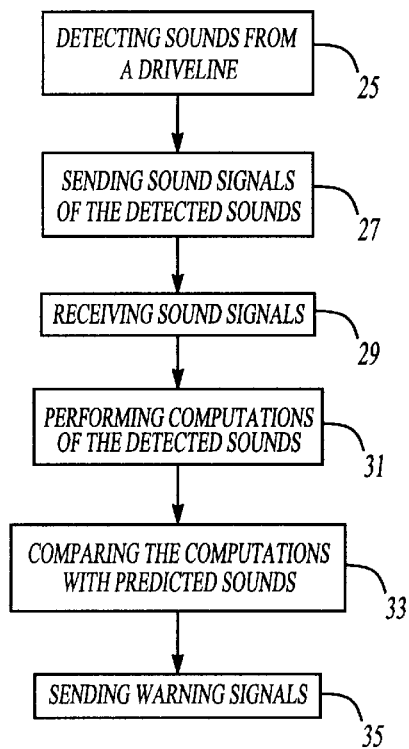
FIG. 2 is a basic flow chart of the present invention.

As it can be seen in FIG. 2, a flow chart for this method could be described as detecting sounds or ultrasounds from a driveline in step 25, sending sound signals of the detected sounds in step 27, receiving sound signals in step 29, performing computations of the detected sounds in step 31, comparing the computations with predicted sounds in step 33, and sending warning signals when a problem may be present in step 35.

In a preferred embodiment, the control 26 stores the predicted sounds of the respective driveline from which sounds are detected. In all of the embodiments, the predicted sounds can be captured as the vehicle begins operation initially. That is, the "proper" sounds may be those made by the driveline when it was new.

Figure 3A:
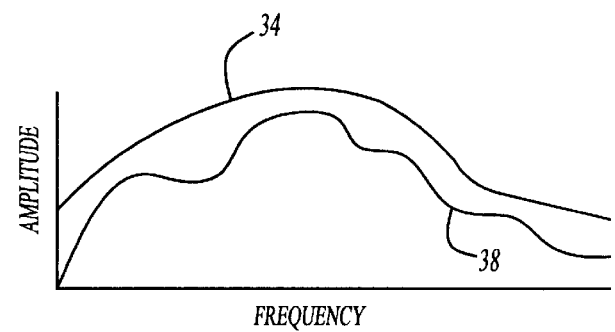
FIG. 3A is a graph of amplitudes of actual detected sounds compared to threshold values used in a preferred embodiment of the present invention.
Figure 3B:
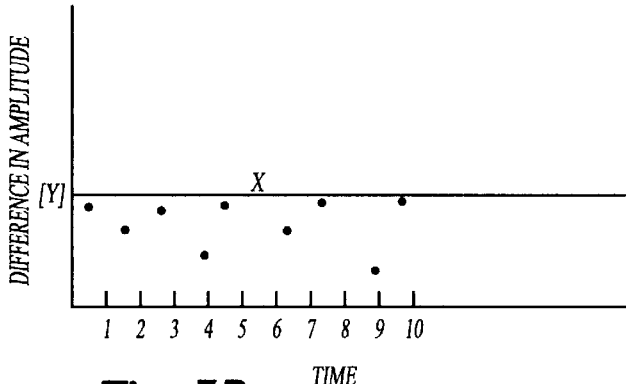
FIG. 3B is a graph of frequency differences between detected sounds and predicted sounds used in the preferred embodiment of the present invention.

As it can be seen in FIGS. 3A and 3B, the predicted sounds include amplitudes of sounds of the driveline of the vehicle in question. The predicted sounds may also include a threshold amplitude 34 and a threshold average difference 36. As can be seen in FIG. 3A, the threshold amplitude 34 is the maximum allowable amplitude versus frequency values. The threshold average difference 36 is the maximum allowable average difference between amplitudes of the detected and predicted sounds. Moreover, the predicted sounds vary according to the type of driveline of the vehicle.

The computations and the steps discussed in any of the embodiments are not set out to limit the scope of the invention; rather, the computations and steps are simply provided to demonstrate a preferred way that the physical condition of a driveline may be determined through this invention. Thus, other additional or substitute computations and steps utilized in the control 26 are within the inventive scope.

Figure 4:
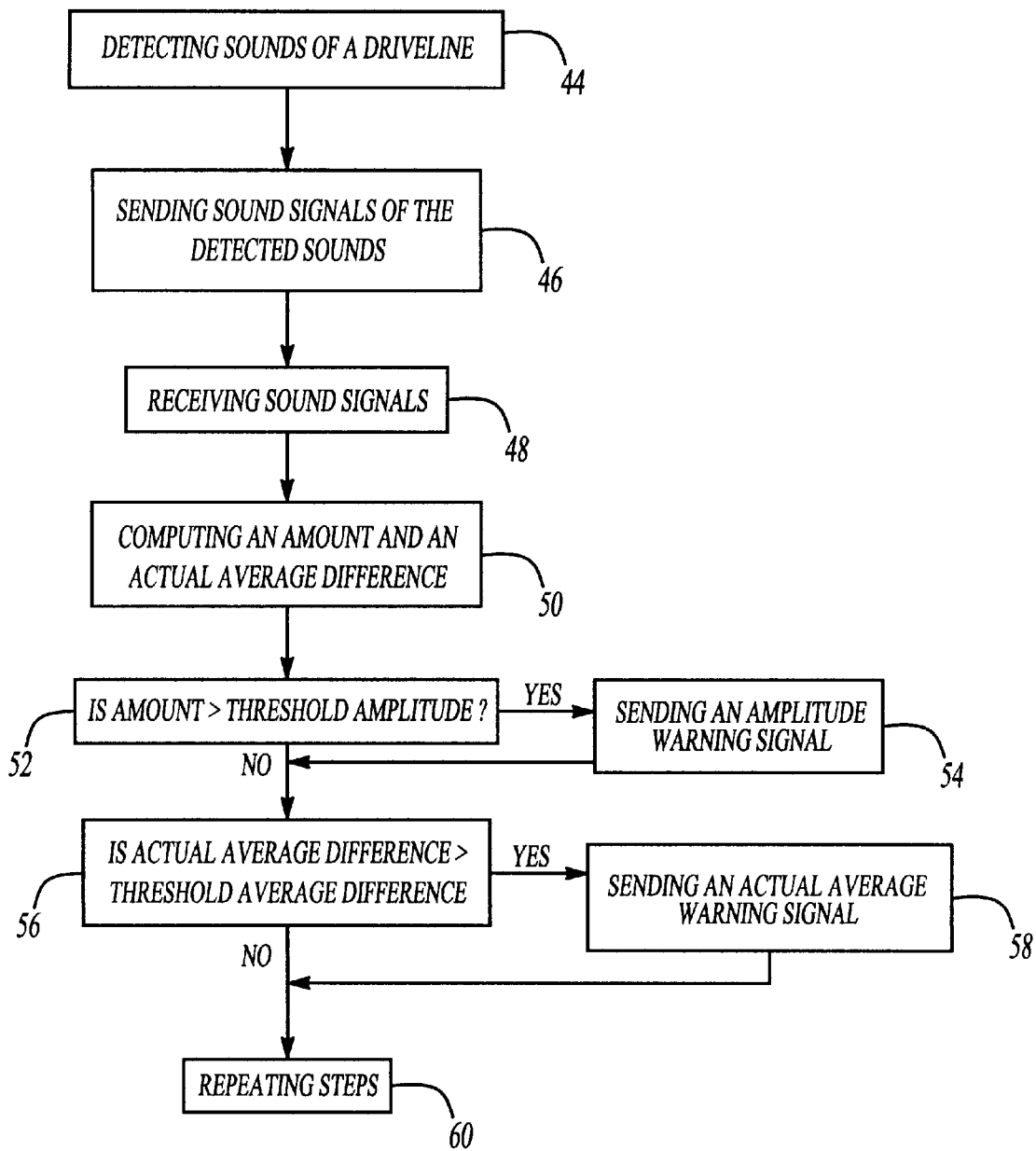
FIG. 4 is a flow chart of the method of the preferred embodiment of the invention.

As it can be seen in FIG. 4, the control 26 generally receives the sound signals 30 from the detector 24 in step 48, performs computations based on the detected sounds in step 50, compares the computations with the predicted sounds in steps 52 and 56, and sends warning signals in steps 54 and 58. Although there may be numerous ways in determining the physical condition of a driveline based on the sounds of the driveline, as exemplified in FIGS. 3A and 3B, the control 26 computes an amount 38 and an actual average difference 40. The amount 38 is the amplitude of frequencies of the detected sounds (i.e. the spectrum). The actual average difference 40 represents the average difference between the amplitudes of the detected and predicted sounds.

As it can be seen in FIG. 4, the control 26 then compares the amount 38 with the threshold amplitude 34 in step 52. If the amount 38 is greater than the threshold amplitude 34, then an amplitude warning signal 32A is sent to the display 28 in step 54 indicating that a potential physical damage to the driveline exists.

Next, the control 26 compares the actual average difference 40 with the threshold average difference 36 in step 56. If the actual average difference 40 is greater than the threshold average difference 36, then an actual average warning signal 32B is sent to the display 28 in step 58 indicating that a potential physical damage to the driveline exists.

Then, control 26 repeats the previous steps of receiving the detected sounds from the detector 24, performing computations, comparing the computations with the predicted sounds, and sending signals when necessary.

Figure 5:
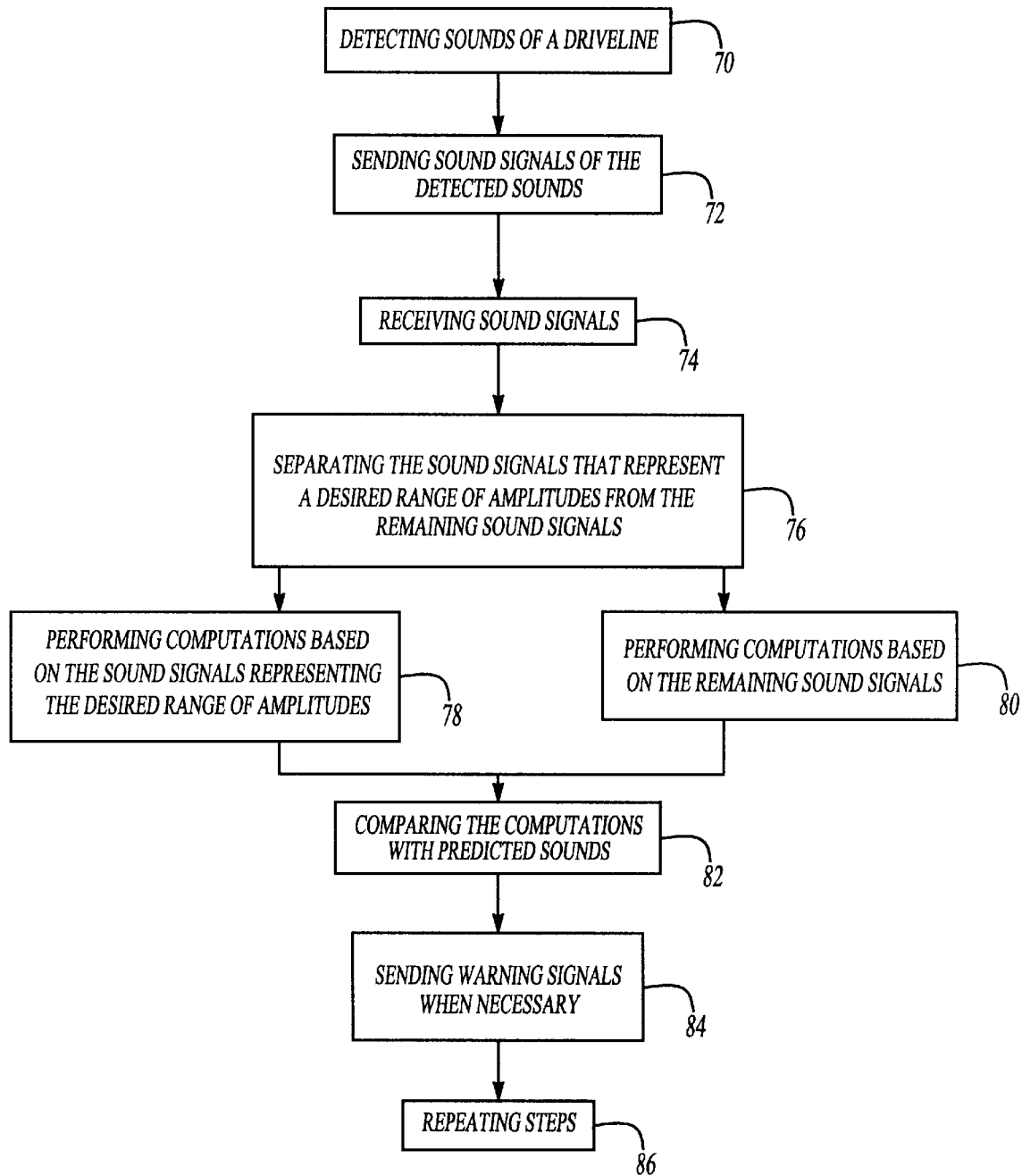
FIG. 5 is a flow chart of the method of another embodiment.

As it can be seen in FIG. 5, frequencies of the detected sounds may be separated and compared according to the amplitude of the frequencies. This may be useful to the driver because greater emphasis on high amplitudes, medium amplitudes, low amplitudes, or specific ranges of frequencies can be achieved. An embodiment of this invention may generally include detecting sounds from a driveline, sending the detected sound signals, receiving the detected sound signals, separating the detected sound signals that represent a desired range of frequencies from the remaining detected sound signals, performing separate computations based on the respective detected sound signals, comparing the computations with the predicted sounds, and sending warning signals when necessary. During the step of performing separate computations, the control 26 may multiply the computations of the desired ranges by a coefficient U and multiply the computations of the remaining ranges by V. Then the products of each may be added to equal a sum which is used in the step of comparing the computations with the predicted sounds. Additionally, the coefficients used in the computations may vary with age of the driveline, miles of the driveline, driveline type, vehicle model, road conditions, or any other useful factor in determining the physical condition of drivelines.

Moreover, a time domain may be used to require that a pre-specified number of events occur within a particular period of time before sending warning signals that a problem may be present. This will limit false warnings based upon an anomaly. In addition, neural networks or fuzzy logic, as it is known in the art, may also be used to implement the present invention.

With there being numerous ways in implementing this invention as shown in FIGS. 4 and 5, it again is to be noted that this invention is not limited to any step of computing or comparing; rather, it uses the steps described above to demonstrate the utility of this new invention and how it may be implemented to monitor the sounds of a driveline.

What is claimed is:

1. A method of monitoring sounds of a driveline comprising:

a. detecting a sound from the driveline, said detecting being performed by a monitor mounted on a vehicle, and said detecting being performed while said vehicle is being operated;

b. comparing the detected sound with a predicted sound of the driveline; and c. sending a signal indicating that the driveline may be experiencing a problem based upon the comparison in the step (b).

2. A method as in claim 1, wherein the problem relates to a potential damage to the driveline.

3. A method as in claim 1, wherein the detected sound is a plurality of sounds of the driveline.

4. A method as in claim 3, wherein the predicted sound includes a plurality of sound values representing normal running conditions and non-normal running conditions of the driveline.

5. A method of monitoring sounds of a driveline comprising:

providing a sound detector, a control, and a display mounted on a vehicle;

detecting a sound from the driveline with the detector and while said vehicle is being operated;

sending sound signals of the detected sounds to the control;

receiving the sound signals with the control;

performing computations of the sound signals;

comparing the computations with a predicted sound of the driveline; and sending a signal to the display that the driveline may be experiencing a problem relating to a potential damage to the driveline, when the detected sound differs from the predicted sound of the driveline.

6. A method as in claim 5, after the step of receiving the sound signals, further comprising the step of separating specific sound signals from the sound signals, wherein the specific sound signals represent a desired range of amplitudes.

7. A method as in claim 6, wherein the step of performing computations of the sound signals includes performing separate computations for each of the specific sound signals.

8. A method as in claim 5, wherein the detected sound is a plurality of sounds of the driveline.

9. A method as in claim 8, wherein the predicted sound is a plurality of pre-determined quantities representing normal running conditions and nonnormal running conditions of the driveline.

* * * * *